US011516998B2

(12) United States Patent
Jiang et al.

(10) Patent No.: US 11,516,998 B2
(45) Date of Patent: Dec. 6, 2022

(54) OUTDOOR DEVICE FOR SIMULATING POND ECOSYSTEM

(71) Applicant: NANJING INSTITUTE OF ENVIRONMENTAL SCIENCES, MINISTRY OF ECOLOGY AND ENVIRONMENT, Jiangsu (CN)

(72) Inventors: Jinlin Jiang, Jiangsu (CN); Zhengjun Shan, Jiangsu (CN); Yue Shi, Jiangsu (CN); Junying Zhou, Jiangsu (CN); Yan Cheng, Jiangsu (CN); Renbin Liu, Jiangsu (CN); Yuanqing Bu, Jiangsu (CN); Weili Xu, Jiangsu (CN)

(73) Assignee: Nanjing Institute of Environmental Sciences, Ministry of Ecology and Environment, Jiangsu (CN)

( * ) Notice: Subject to any disclaimer, the term of this patent is extended or adjusted under 35 U.S.C. 154(b) by 436 days.

(21) Appl. No.: 16/877,627

(22) Filed: May 19, 2020

(65) Prior Publication Data
US 2021/0267178 A1 Sep. 2, 2021

(30) Foreign Application Priority Data

Feb. 28, 2020 (CN) .......................... 202010127022.X

(51) Int. Cl.
*E04H 4/12* (2006.01)
*A01K 63/04* (2006.01)
(Continued)

(52) U.S. Cl.
CPC ............ *A01K 63/047* (2013.01); *A01K 63/06* (2013.01); *E04H 4/0075* (2013.01); *E04H 4/12* (2013.01);
(Continued)

(58) Field of Classification Search
CPC .... A01K 63/047; A01K 63/06; E04H 4/0075; E04H 4/12; E04H 4/148; E04H 2004/146
(Continued)

(56) References Cited

U.S. PATENT DOCUMENTS

| 4,052,757 A | * | 10/1977 | Dotson | .................. | A61H 33/60 |
| | | | | | 4/493 |
| 4,606,819 A | * | 8/1986 | Colson | ...................... | E04H 4/12 |
| | | | | | 210/167.13 |

(Continued)

OTHER PUBLICATIONS

Yuyao, Huang et al.; "Design and Application of Model Pond Ecosystems"; Chin. J. Appl. Environ. Biol., 1995, 1(2), 103-113.

*Primary Examiner* — Huyen D Le
(74) *Attorney, Agent, or Firm* — Ohlandt, Greeley and Perle, LLP

(57) ABSTRACT

The disclosure provides an outdoor device for simulating a pond ecosystem comprising a plurality of simulated ponds connected together by pipelines and including an adjusting pool, a plurality of control groups and a plurality of treatment groups with different concentrations; the plurality of control groups and the treatment groups are randomly distributed in the ponds according to a random draw method or a random allocation method, and the adjusting pool is a transfer station for water inlets and outlets of the ponds. According to the device, the plurality of control groups and treatment groups are arranged in a system, achieving a scale of a middle-scale pond ecological simulation system, which can stimulate an actual complex hydrostatic ecological system including a plurality of aquatic macrophytes, algae, zooplankton, benthos and microorganisms, and evaluate the effects of the complex ecological efficiency caused by chemical pollutants entering an actual water body.

8 Claims, 2 Drawing Sheets

(51) Int. Cl.
  *A01K 63/06*      (2006.01)
  *E04H 4/00*       (2006.01)
  *E04H 4/14*       (2006.01)

(52) U.S. Cl.
  CPC ....... *E04H 4/148* (2013.01); *E04H 2004/146* (2013.01)

(58) Field of Classification Search
  USPC .......................................................... 119/200
  See application file for complete search history.

(56) References Cited

U.S. PATENT DOCUMENTS

| | | | | |
|---|---|---|---|---|
| 4,607,399 | A * | 8/1986 | Yovanofski | E04H 4/12 137/429 |
| 6,000,425 | A * | 12/1999 | Steinorth | F16K 21/18 137/391 |
| 2008/0257800 | A1* | 10/2008 | Gagner | E04H 4/12 210/96.1 |
| 2021/0195874 | A1* | 7/2021 | Holm | A01K 63/042 |

* cited by examiner

OUTDOOR DEVICE FOR SIMULATING POND ECOSYSTEM

CROSS REFERENCE TO RELATED APPLICATION

This application claims the benefit of priority to Chinese Patent Application No. 202010127022.X titled "OUTDOOR DEVICE FOR SIMULATING POND ECOSYSTEM", filed with the Chinese State Intellectual Property Office on Feb. 28, 2020, the entire disclosure of which is incorporated herein by reference.

TECHNICAL FIELD

The disclosure relates to the technical field of pond ecosystem simulation, in particular to an outdoor device for simulating pond ecosystem.

BACKGROUND ART

An outdoor simulated pond ecosystem is a kind of aquatic mesocosm technology. When results from primary and advanced laboratory toxicological tests (for one or more species) indicate that a chemical substance has a potential risk to aquatic organisms, the outdoor simulated pond ecosystem can be used to evaluate real aquatic ecological risks of the chemical substance.

In the prior literature: *Design and Application Research of Model Pond Ecosystem, Chinese Journal of Applied and Environmental Biology*, 1995, 1(2), 103-113, Yuyao Huang, Yurong Gao, Shuzhi Ren, et al., the results of design, construction and application research of three models of pond ecosystem, namely, a pond microcosm, a pond mesocosm and a model water-land ecosystem, are briefly reported. The design of the pond mesocosm is exemplified as a general design, construction and application of a glass fiber reinforced water tank $(3\times1\times1)$ $m^3$, in which a certain amount of dry river mud with aquatic organism seeds, spores and ovums is bedded, and tap water is dumped. In a case that an initial concentrations of nitrogen and phosphorus are formulated according to a medium-rich nutrition level, typical submerged plant communities can be obtained respectively after being cultivated for about one month, and can be maintained for several months. The water in the water tank is drained out in winter, water injection culture is carried out in a next year, the biological communities can be grown again, and the system can be continuously used for several years. Wherein, the author actually uses semiamitraz as a test pesticide, and the experimental result shows that such simulation system can be used as a good tool to evaluate and predict overall ecological efficiency caused by chemical pollutants entering water directly or via a surface runoff.

However, the above-mentioned simulated pond ecosystem still has the following defects: 1) the design of the system size does not achieve a scale of an actual middle-scale pond ecological simulation system, a direct influence of which lies in that an actual complex hydrostatic ecological system cannot be simulated with a plurality of aquatic macrophytes, algae, zooplankton, benthos and microorganisms. Although a small system has a small variation coefficient among different parallel processings to a certain extent, it has a limited effect on evaluating the complex ecological efficiency caused by chemical pollutants entering an actual water body; 2) due to the scale and structural characteristics of the system, it can only be placed in a room or a space with a high artificial interference, and cannot simulate the ecosystem under the actual field environment condition. Therefore, it has a limited effect on evaluating the complex ecological efficiency caused by the chemical pollutants entering the actual water body.

SUMMARY OF THE INVENTION

The present disclosure intends to provide an outdoor device for simulating pond ecosystem in order to solve the problems of the related art described above, with a design of a complete set of equipment capable of performing an advanced toxicology test for outdoor simulation of the pond ecosystem (mesocosm).

In order to achieve the above effects, the disclosure provides the following solution. The disclosure provides an outdoor device for simulating pond ecosystem comprising a plurality of simulated ponds connected together by pipelines, wherein, the plurality of simulated ponds comprise a adjusting pool, a plurality of control groups and a plurality of treatment groups with different concentrations; the plurality of control groups and the treatment groups with different concentrations are randomly distributed in the ponds according to a random draw method or a random allocation method, and the adjusting pool is a transfer station for water inlets and outlets of the ponds in the control groups and the treatment groups with different concentrations.

Optionally, the pond comprises a pool tank body placed in a cement pit, a removable lining disc is arranged at the bottom of the pond tank body, and a bottom mud is placed on the lining disc.

Optionally, a plurality of pressing plates are uniformly distributed along the circumference of the top of the pool tank body, one end of the pressing plate is fixed with a pool wall on the top of the pool tank body by bolts, and the other end of the pressing plate is fixedly connected with a top edge of the cement pit.

Optionally, the pool tank body is made of an inert material; and a main body of the pool tank body is buried underground, with an upper edge of the pool tank body above the ground by 20-30 cm.

Optionally, each pool tank body comprises a water inlet pipeline, a backflow pipeline and control valves; water in the adjusting pool is pumped to the water inlet pipeline of each pool tank body by a centrifugal pump, and the backflow pipelines of pool tank bodies are communicated; and each of the water inlet pipelines and the backflow pipelines is provided with the control valve.

Optionally, the device further comprises a circuitry system for supplying power to a lighting equipment and the centrifugal pump.

Optionally, the position of the adjusting pool is lower than those of other ponds.

Optionally, the device further comprises a separation net arranged on an outer side of the pond.

Compared with the related art, the disclosure has the following technical effects.

According to the outdoor device for simulating the pond ecosystem, a plurality of control groups and treatment groups with different concentrations are arranged in a system, achieving a scale of a middle-scale pond ecological simulation system, which can stimulate an actual complex hydrostatic ecological system including a plurality of aquatic macrophytes, algae, zooplankton, benthos and microorganisms, and evaluate the effects of the complex ecological efficiency caused by chemical pollutants entering an actual water body.

BRIEF DESCRIPTION OF THE DRAWINGS

In order to more clearly illustrate the embodiments of the present disclosure or technical solutions in the related art, the accompanying drawings used in the embodiments will now be described briefly. It is obvious that the drawings in the following description are only some embodiments of the disclosure, and that those skilled in the art can obtain other drawings from these drawings without any inventive effort.

DETAILED DESCRIPTION OF THE INVENTION

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by those skilled in the art without any creative effort are within the scope of the present disclosure.

The present disclosure intends to provide an outdoor device for simulating pond ecosystem in order to solve the problems of the related art described above, with a design of a complete set of equipment capable of performing an advanced toxicology test for outdoor simulation of the pond ecosystem (mesocosm).

To further clarify the above effects, features and advantages of the present disclosure, a more detailed description of the disclosure will be rendered by reference to the appended drawings and detailed embodiments thereof.

As shown in FIGS. 1-4, the disclosure provides an outdoor device for simulating pond ecosystem, which includes 14 cylindrical simulated ponds with 2.75 m in diameter, 1.55 m in total depth and water depth above surface sediments: 1 m, herein, it should be noted that the size is only taken as a general reference for the embodiments, and the volume of the water body can be kept above 15 m$^3$, with approximate variations being acceptable. Herein, three pools are used as control groups, and five concentration treatment groups. Two parallel pools are arranged for each concentration treatment group.

Before the test, in order to reflect the principle of repetition and randomness of the test, the control groups and the treatment groups with different concentrations are associated with serial numbers of the pools according to a random grouping method such as a random draw or a random number table, so that the control groups and the treatment groups are randomly distributed in the thirteen pools from No. 1 to No. 13 during the test. Another pool (No. 14 pool) is provided separately as an adjusting pool. The adjusting pool is configured as a transfer station for water inlet and outlet of each pond, and a standby pool for the water ecological system during the test. The pools are connected together by a piping system.

Figure 1:
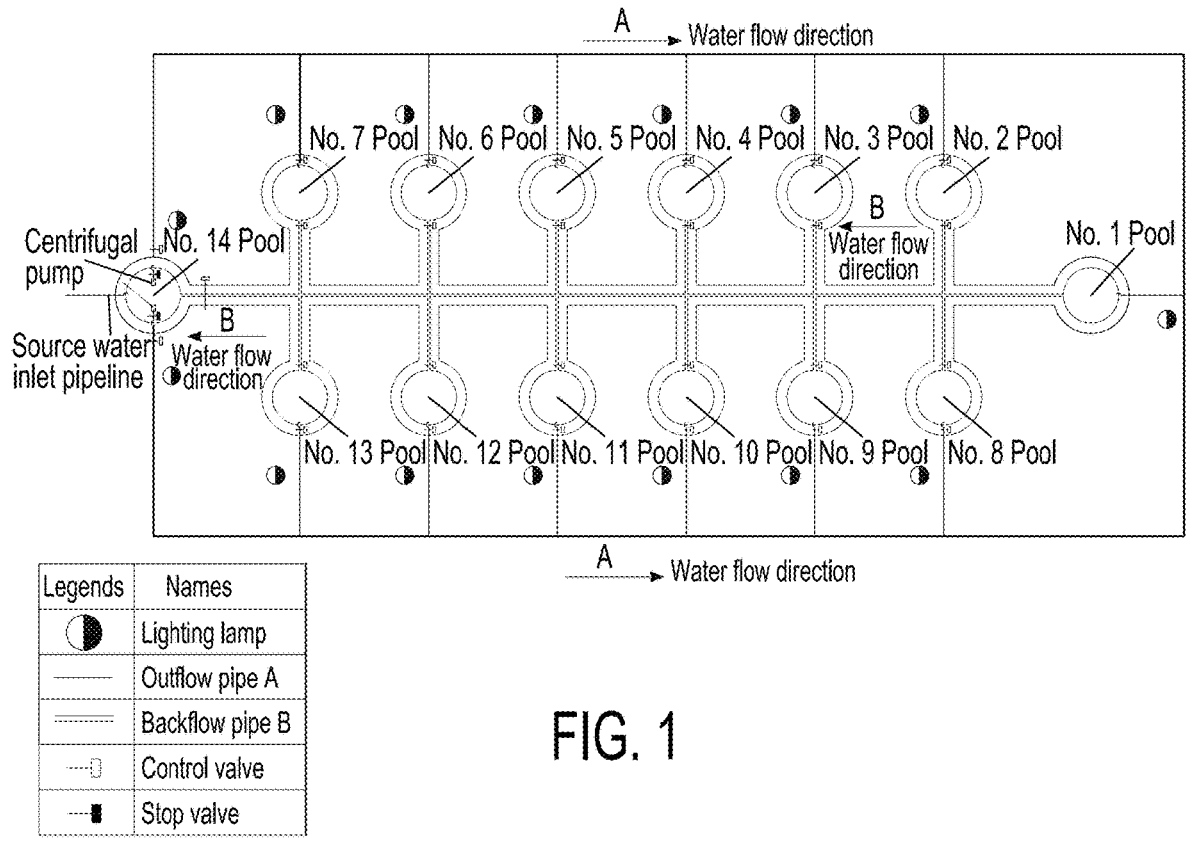
FIG. 1 is a schematic view showing a whole structure of an outdoor device for simulating pond ecosystem.
Figure 2:
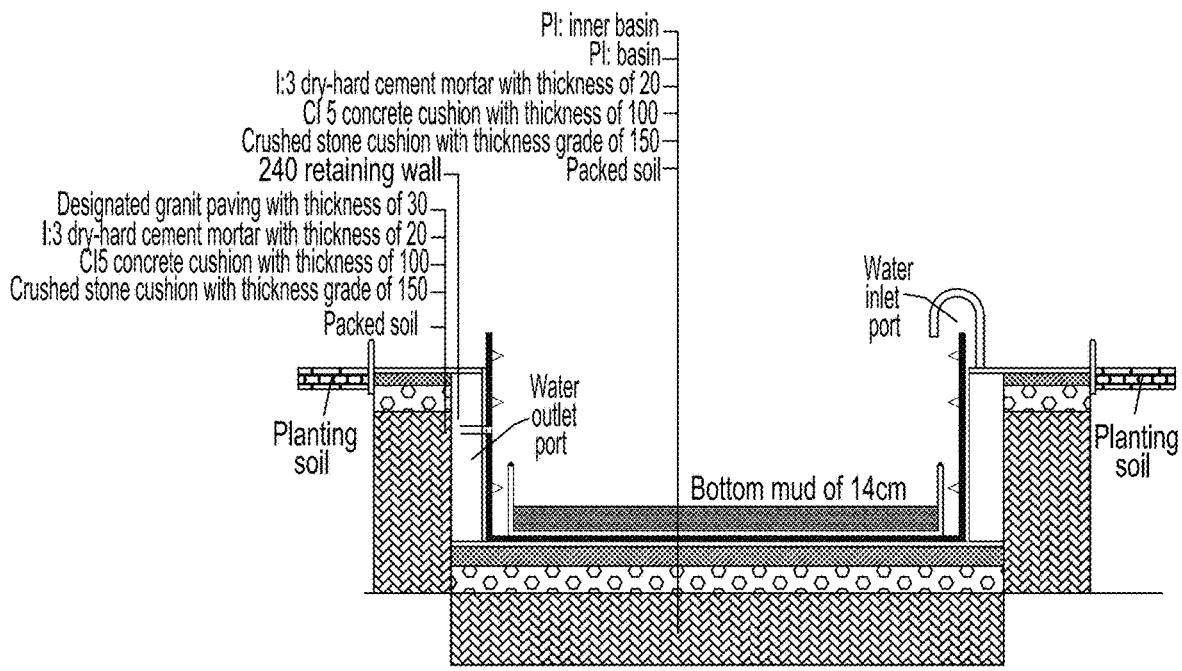
FIG. 2 is a construction drawing of a single pond.

The pool construction material for simulating ponds should be inert materials such as PE (polyethylene), HDPE (high density polyethylene) and glass fiber, which have good plasticity, strong corrosion resistance and high mechanical strength, to construct a single pool system in the mesocosm, and the whole structure and a single structure are shown in FIGS. 1 and 2. It is noted that materials with small specific heat capacity, such as cement, should be avoided, which can easily cause large fluctuations in water temperature in the mesocosm system. In addition, most of the tank body of the mesocosm pool is buried underground, so that the system is stable in temperature and convenient to operate. Furthermore, an upper edge of the tank body is above the ground by 20-30 cm, so as to protect small animals from entering the tank body accidently, to avoid a system interference. A cement pit is built before the tank body of the pool is placed, and then the tank body is integrally put into the pit. The cement pit and the tank body have different connection and fixing modes according to the different inert materials for constructing the pool. For example, in a case that a glass fiber pressing plate is adopted to construct the pool, it can be thermoformed to directly integrated with the water tank, or one end of the pressing plate can be fixed at a top end of the outer side of the pool wall by bolts to be perpendicular to the pool wall, and the other end of the pressing plate is fixedly connected with the cement pit structure, so that the pool is tightly and rigidly connected with external cement, to avoid mechanical extrusion deformation to the water tank body caused by a rising level of underground water.

Pools of different simulated ponds should be provided with a network of communication circulating water pipes (a water inlet pipeline and a backflow pipeline in FIG. 1) and a control valve. Through a centrifugal pump located in the No. 14 pool, the water from the No. 14 pool flows to the Nos. 1-13 pools via the water inlet pipeline. Due to the fact that pipelines (backflow pipelines) are communicated among the pools, under the action of water level difference, the water in each pool flows back to the No. 14 pool through the pipelines, and the system in the Nos. 1-14 pools can achieve uniformity by a continuous operation of the water pump. Control valves are arranged on the water inlet pipeline and the backflow pipeline, water circulation communication is cut off one week before a formal test, so that each pool is an independent water ecological system.

The adjusting pool (No. 14) is suggested to be arranged with a certain elevation difference from other pools (Nos. 1-13). For example, the backflow pipeline (B) from the No. 1 pool to the No. 14 pool should also have a certain elevation difference, that is, the No. 14 pool is located slightly lower than other pools, and the backflow pipeline (B) also has a certain inclination angle correspondingly, so as to achieve that the water of each pool flows to the adjusting pool by fully utilizing the elevation pressure difference during a waterway circulation.

Figure 3:
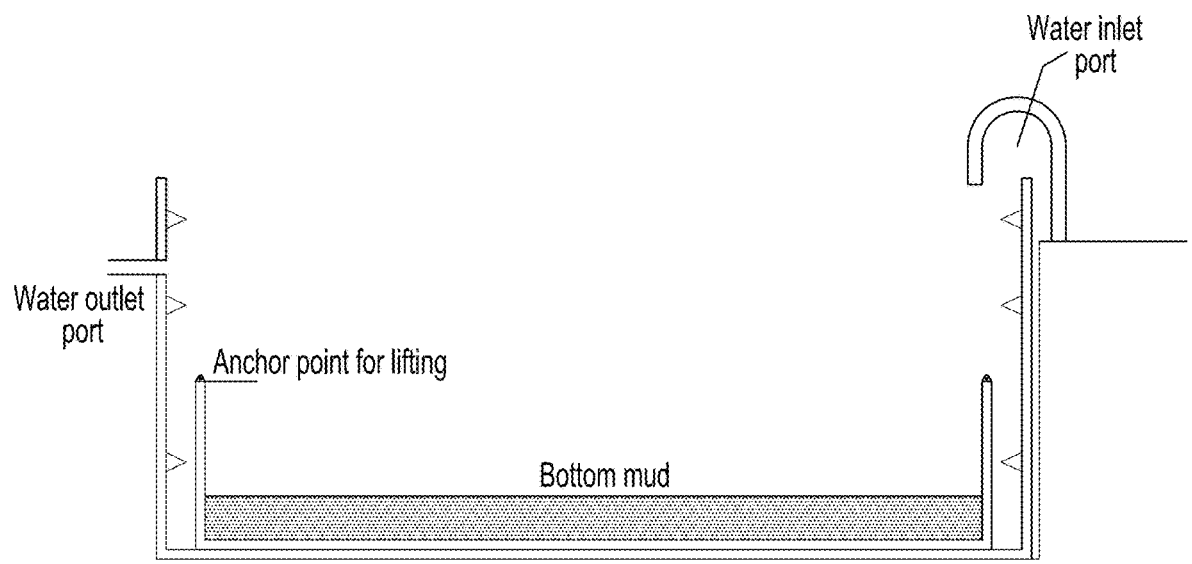
FIG. 3 is a structure diagram of a single pond.
Figure 4:
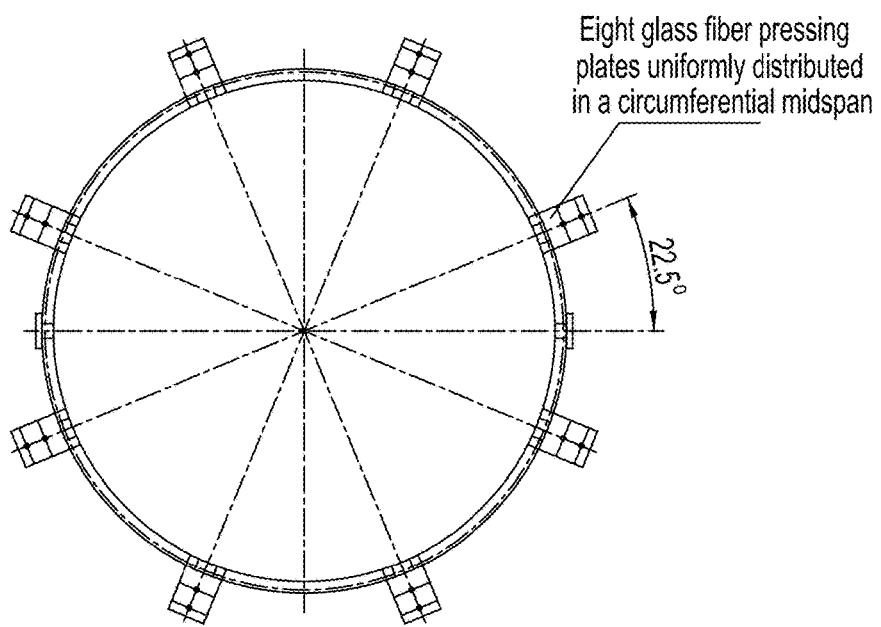
FIG. 4 is a distribution diagram of a pressing plate.

As shown in FIGS. 2 and 3, a tray-shaped lining disc (in this embodiment, the inner diameter of the water tank is 2.75 m, the outer diameter of the lining disc is 2.5 m, and the height of the lining disc is about 0.5 m, see FIG. 2), which is slightly smaller than the inner diameter of the water tank, is placed in each pool. 3 to 4 anchor points for fixing a large lifting device are arranged inside the lining disc. During operation, 10-15 cm of bottom mud is placed in the lining disc. The lining disc can be directly lifted up, cleaned and replaced for the bottom mud.

The outdoor device for simulating pond ecosystem also has security settings, such as a circuit and a separation net, to ensure that the device can stay in a normal working state. The circuit can supply power to the water pump and a lighting system, and the separation net can prevent non-workers, extraneous organisms such as animals and birds from influencing the system.

The outdoor device for simulating pond ecosystem should be provided with a test system of an outdoor simulated aquatic ecology (mesocosm) system controlled under certain artificial control conditions so as to evaluate the influence of chemicals such as pesticides on different aquatic organism populations and even the whole aquatic ecosystem. For example, a measure such as using a simple sunshade net is provided to cope with rare high-temperature sunlight conditions; a measure of supplying clean water source is provided to cope with the condition that the evaporation is too large under drought conditions; the separation net is constructed to prevent extraneous organisms such as rats and birds from interfering with the system, and protect irrelevant personnel from falling into water accidentally (the sunshade net and the separation net are not shown in the schematic diagrams).

The principles and implementation of the present disclosure have been described herein with specific examples, and the above embodiments are described for a better understanding of the methods and core concepts of the present disclosure. Meanwhile, changes will occur to those skilled in the art in both the detailed description and the scope of application according to the teachings of this disclosure. In conclusion, the contents of the description should not be construed as limiting the disclosure.

What is claimed is:

1. An outdoor device for simulating pond ecosystem, comprising:
    a plurality of simulated ponds connected together by pipelines,
        wherein, the plurality of simulated ponds comprise an adjusting pool, a plurality of control groups, and a plurality of treatment groups with different concentrations; the plurality of control groups and the plurality of treatment groups with different concentrations are randomly distributed in the ponds according to a random draw method or a random allocation method, and the adjusting pool is a transfer station for water inlets and outlets of the ponds in the control groups and the treatment groups with different concentrations.

2. The outdoor device for simulating pond ecosystem according to claim 1, wherein the pond comprises a pool tank body placed in a cement pit, a removable lining disc is arranged at a bottom of the pond tank body, and bottom mud is placed on the lining disc.

3. The outdoor device for simulating pond ecosystem according to claim 2, wherein a plurality of pressing plates are uniformly distributed along the circumference of a top of the pool tank body, one end of each pressing plate is fixed with a pool wall on the top of the pool tank body by a bolt, and the other end of each pressing plate is fixedly connected with a top edge of the cement pit.

4. The outdoor device for simulating pond ecosystem according to claim 2, wherein the pool tank body is made of an inert material; and a main body of the pool tank body is buried underground, with an upper edge of the pool tank body above the ground by 20-30 cm.

5. The outdoor device for simulating pond ecosystem according to claim 2, wherein each pool tank body comprises a water inlet pipeline, a backflow pipeline and control valves; water in the adjusting pool is pumped to the water inlet pipeline of each pool tank body by a centrifugal pump, and the backflow pipelines of pool tank bodies are communicated; and each of the water inlet pipelines and the backflow pipelines is provided with the control valve.

6. The outdoor device for simulating pond ecosystem according to claim 5, further comprising a circuitry system for supplying power to a lighting equipment and the centrifugal pump.

7. The outdoor device for simulating pond ecosystem according to claim 1, wherein the position of the adjusting pool is lower than those of other ponds.

8. The outdoor device for simulating pond ecosystem according to claim 1, further comprising a separation net arranged on an outer side of the pond.

* * * * *